(12) United States Patent
Tsujimoto

(10) Patent No.: US 8,291,262 B2
(45) Date of Patent: Oct. 16, 2012

(54) IMAGE PROCESSING APPARATUS AND IMAGE PROCESSING SYSTEM

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 290 days.

(21) Appl. No.: 12/827,040

(22) Filed: Jun. 30, 2010

(65) Prior Publication Data
US 2011/0004789 A1    Jan. 6, 2011

(30) Foreign Application Priority Data

Jul. 1, 2009    (JP) .................................. 2009-156849

(51) Int. Cl.
*G06F 11/00* (2006.01)

(52) U.S. Cl. .... 714/18; 358/1.14; 358/405; 358/426.06; 358/504; 358/505; 399/19

(58) Field of Classification Search .................. 358/1.14, 358/405, 406, 426.05, 426.06, 426.09, 504, 358/505; 399/18, 19; 714/18
See application file for complete search history.

(56) References Cited

U.S. PATENT DOCUMENTS

| | | | | |
|---|---|---|---|---|
| 5,606,429 A * | 2/1997 | Sheldon et al. | ............... | 358/450 |
| 5,768,483 A * | 6/1998 | Maniwa et al. | ............. | 358/1.15 |
| 6,226,096 B1 * | 5/2001 | Ouchi | ........................ | 358/1.14 |
| 6,633,394 B2 * | 10/2003 | Kawaguchi et al. | ......... | 358/1.14 |
| 7,151,900 B2 * | 12/2006 | Utsunomiya | .................... | 399/21 |
| 7,301,658 B2 * | 11/2007 | Henry | .......................... | 358/1.15 |
| 7,466,456 B2 * | 12/2008 | Kanno | ..................... | 358/426.06 |
| 7,675,639 B2 * | 3/2010 | Shimizu | ....................... | 358/1.14 |
| 7,701,597 B2 * | 4/2010 | Machiyama | ................. | 358/1.14 |
| 7,889,368 B2 * | 2/2011 | Iida et al. | ..................... | 358/1.15 |
| 7,895,508 B2 * | 2/2011 | Lee | ............... | 714/799 |
| 2003/0200266 A1 * | 10/2003 | Henry | .......................... | 709/206 |
| 2004/0221205 A1 * | 11/2004 | Kozlov et al. | ................... | 714/47 |
| 2009/0296130 A1 * | 12/2009 | Ohtsu | .......................... | 358/1.14 |
| 2010/0007908 A1 * | 1/2010 | Homma | ....................... | 358/1.14 |
| 2010/0110504 A1 * | 5/2010 | Shimada | ....................... | 358/474 |
| 2011/0038014 A1 * | 2/2011 | Ito | ................................. | 358/406 |

FOREIGN PATENT DOCUMENTS

| | | |
|---|---|---|
| JP | 61-255158 | 11/1986 |
| JP | 10-065862 | 3/1998 |
| JP | 2002-290498 | 10/2002 |

* cited by examiner

*Primary Examiner* — Joshua P Lottich
(74) *Attorney, Agent, or Firm* — David G. Conlin; Steven M. Jensen; Edwards Wildman Palmer LLP

(57) ABSTRACT

An image processing apparatus includes an input portion for inputting image information, an information storage portion for storing the input image information, a transmission portion for transmitting the image information, and a control portion for processing input, storage and transmission of image information in parallel. The control portion, in the case where an input error occurs in the middle of performing input of image information, causes a transmission portion to transmit an instruction to delete information that has been transmitted to a transmission destination, and to start a retransmission after combining the image information before the input error occurs with the image information input after the input error occurred to form one file.

5 Claims, 13 Drawing Sheets

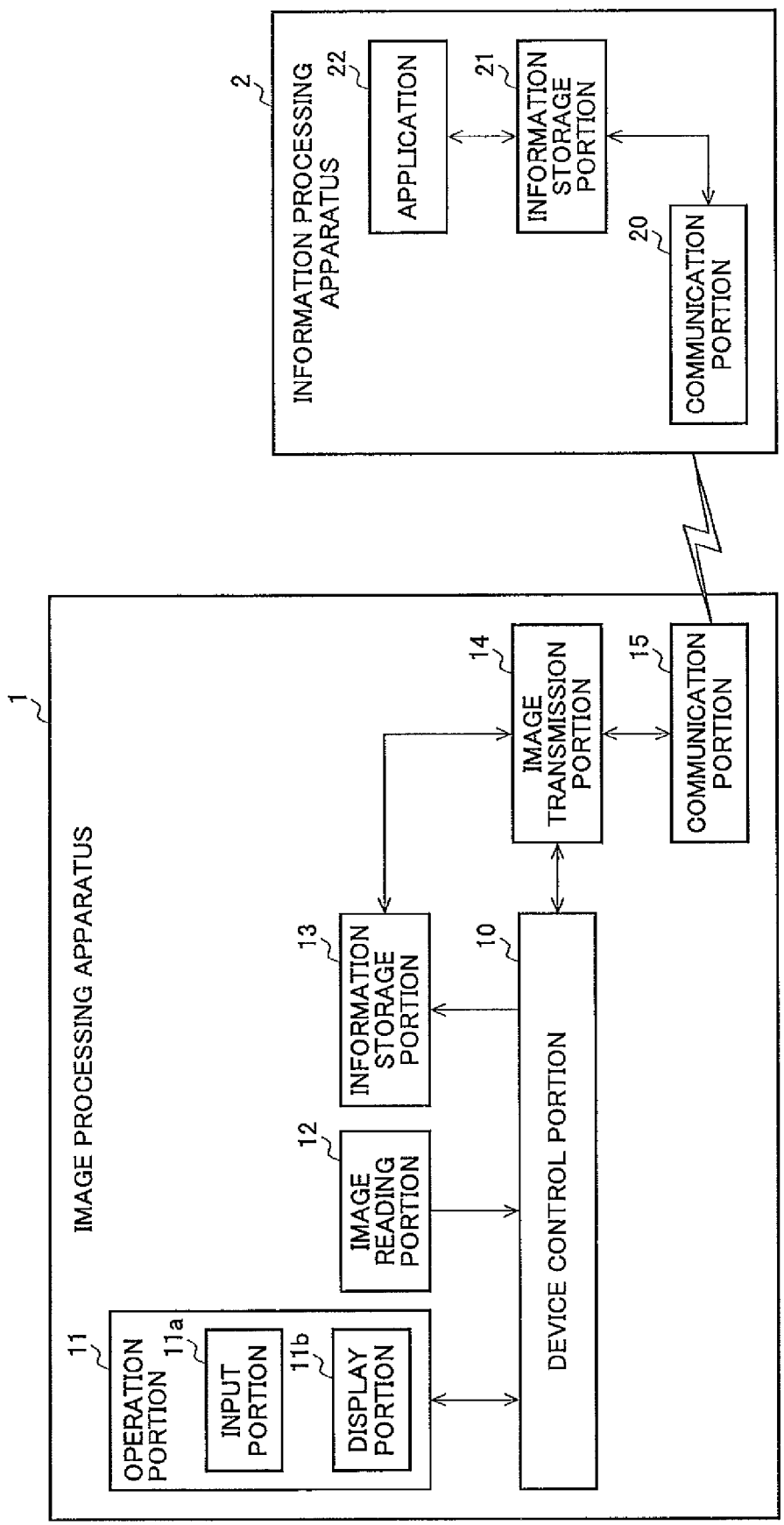

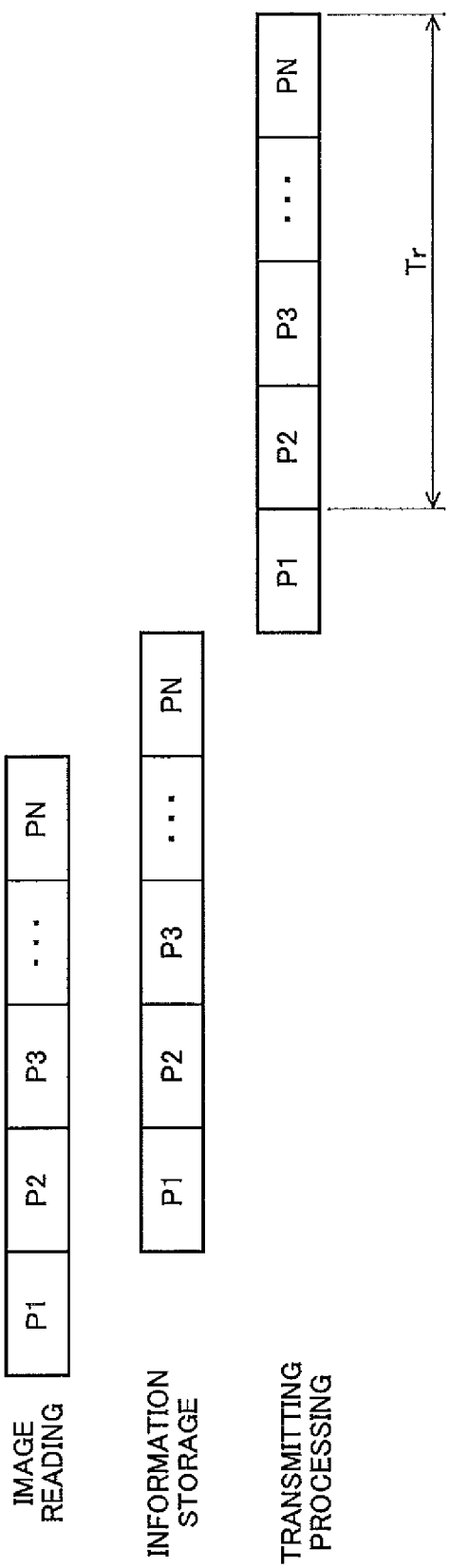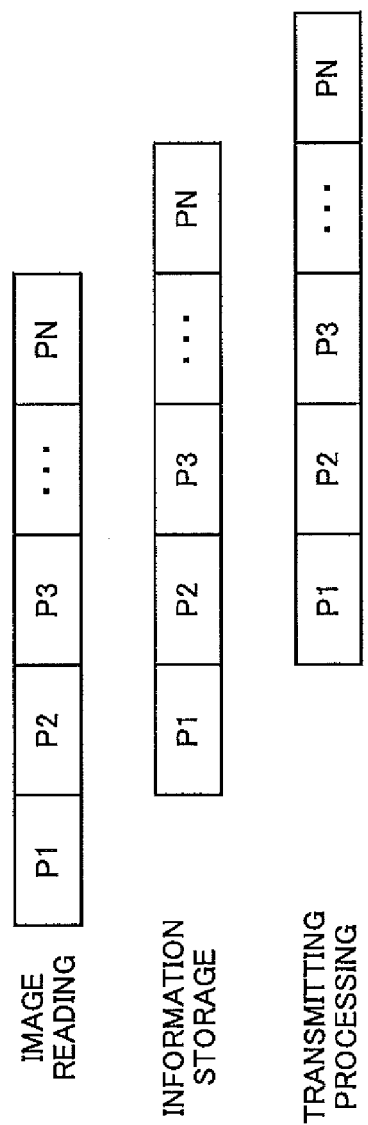

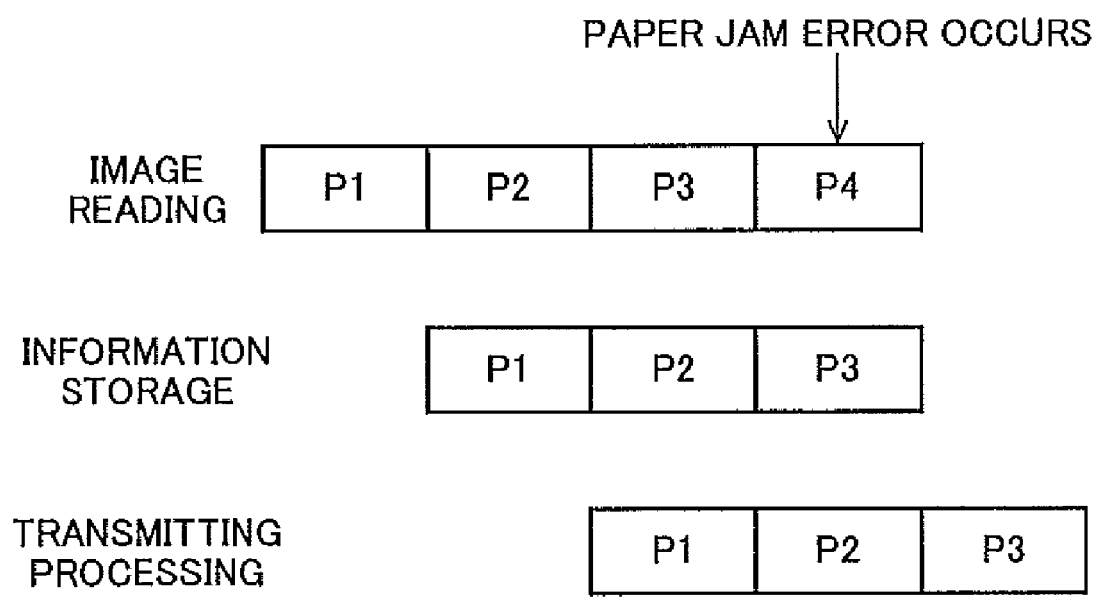

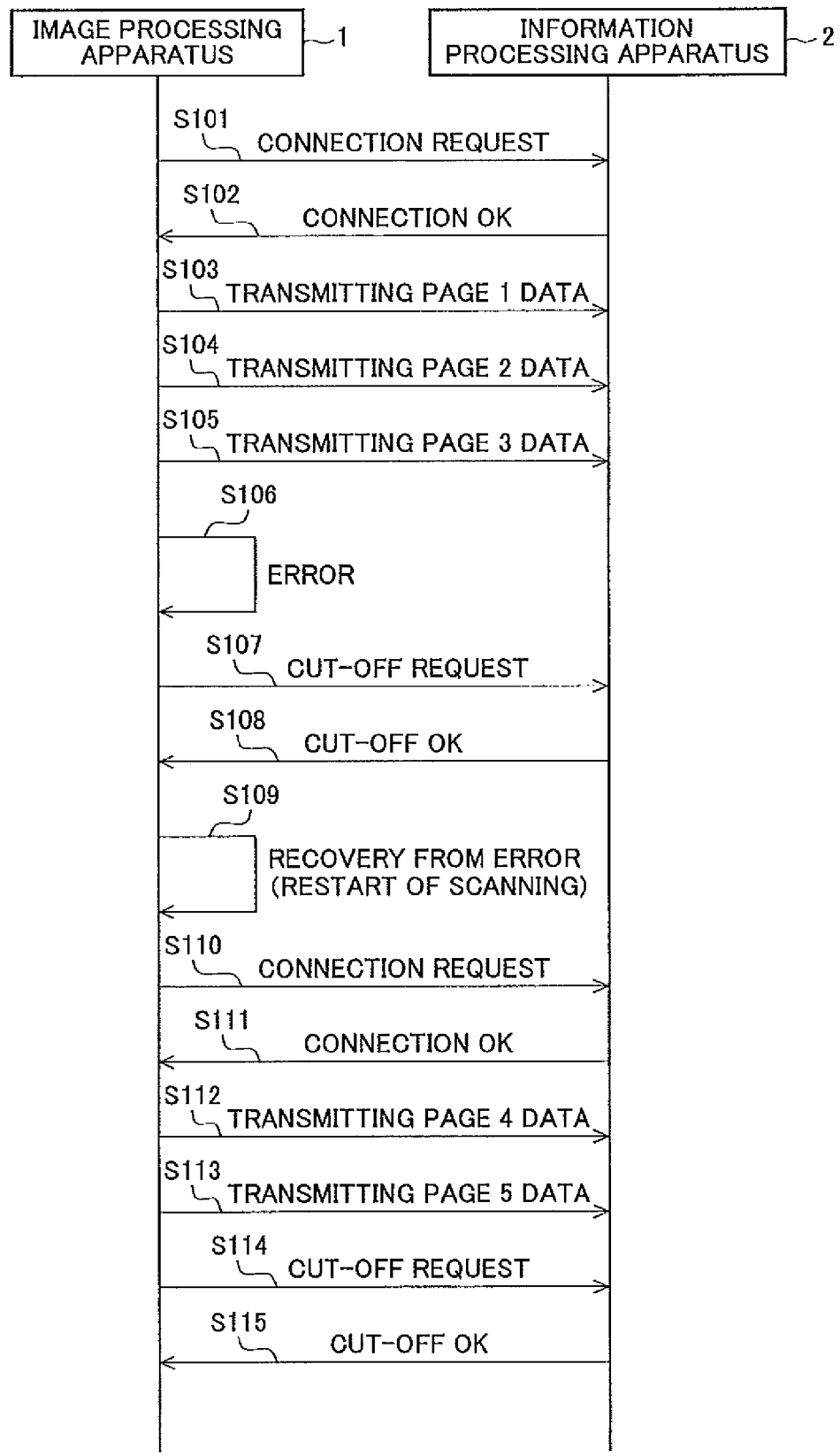

IMAGE PROCESSING APPARATUS AND IMAGE PROCESSING SYSTEM

CROSS-NOTING PARAGRAPH

This non-provisional application claims priority under 35 U.S.C. §119(a) on Patent Application No. 2009-156849 filed in JAPAN on Jul. 1, 2009, the entire contents of which are hereby incorporated herein by reference.

FIELD OF THE INVENTION

The present invention relates to an image processing apparatus capable of inputting image information and transmitting it, and an image processing system provided with the image processing apparatus and an information processing apparatus.

BACKGROUND OF THE INVENTION

Conventionally, an image processing apparatus capable of transmitting image information input by reading with a scanner or the like to an external information processing apparatus has been proposed.

Conventionally, when image data generated in an image processing apparatus provided with a scanning function is transmitted to the outside, as a timing shown in FIG. 2A, read data is all retained once in an HDD (Hard Disk Drive) or a memory, and transmitting processing is started after a transmission file is generated inside the image processing apparatus.

On the other hand, in order to improve performance of the scanning function, as a timing shown in FIG. 2B, an image processing apparatus has been recently proposed such that a scanned document is read, and at the same time, data transmitting processing is performed, which is made to be one file at a transmission destination, thereby scanning transmitting processing is speeded up.

Japanese Laid-Open Patent Publication No. 10-65862 discloses an image communication apparatus which transmits image information and communication history information to an information processing apparatus and at the time of occurrence of a transmission error, performs retransmission by using the image information and the communication history information.

Japanese Laid-Open Patent Publication No. 61-255158 discloses a facsimile transmission system in which image information is stored once in an image memory at the time of reception, a reception error is sent to a transmission side when the received image information is determined as an error, and the image information that is stored in the image memory is deleted when it is notified that image information is retransmitted responding to this from the transmission side.

An image processing apparatus for performing transmitting processing at a timing as illustrated in FIG. 2B has an entire required time for transmitting processing which is shortened by only Tr compared to transmitting processing at the timing illustrated in FIG. 2A, however, in the case of occurrence of a paper jam error while reading a document, image data of a document that has been read until the error occurs has already been on transmitting processing, and therefore, it is impossible to stop the transmitting processing until a user cancels the error to restart reading of the document.

Therefore, there was a method only to transmit data including pages that have read until a paper jam error occurs and stop scanning processing in the middle of it, or to cancel scanning itself to perform the scanning processing from the beginning again.

Note that, both of technologies that are described in Japanese Laid-Open Patent Publication No. 10-65862 and Japanese Laid-Open Patent Publication No. 61-255158 are those concerning the means for retransmitting when a communication error occurred in the data that was once read, and they do not describe or suggest the case where an input error occurs in the middle of reading in a system for performing transmission while reading a document.

SUMMARY OF THE INVENTION

The present invention has been conceived in view of the actual situation as described above, and an object thereof is to provide an image processing apparatus capable of performing transmission of image information effectively even in the case where an input error of image information, such as a paper jam error, occurs, and an image processing system provided with the image processing apparatus and an information processing apparatus.

In order to solve the above problems, a first technical means of the present invention is an image processing apparatus including an input portion for inputting image information; an information storage portion for storing the image information input by the input portion; a transmission portion for transmitting the image information; and a control portion for processing input at the input portion, storage at the information storage portion and transmission at the transmission portion in parallel, wherein the control portion, in case where an input error occurs in the middle of performing input of image information by the input portion, controls the transmission portion to transmit an instruction to delete information that has been transmitted to a transmission destination to the transmission destination, combines the image information before the input error occurs with the image information input at the input portion after the input error occurred to form one file, and controls the transmission portion to retransmit the file.

A second technical means is the first technical means, wherein the control portion performs different post-error recovery processing for an input error and for other type of errors.

A third technical means is the second technical means, wherein the control portion, when the other type of errors is a communication error, controls the transmission portion to start retransmission after checking a communication state with the transmission destination for a predetermined time.

A fourth technical means is the second technical means, wherein the control portion, when the communication to the transmission destination is not established again, designates a second transmission destination and controls the transmission portion to perform transmission.

A fifth technical means is an image processing system provided with the image processing apparatus in any of the first to fourth technical means and an information processing apparatus connected to the image processing apparatus, wherein the information processing apparatus includes a reception portion that receives image information transmitted from the image processing apparatus; a storage portion that stores the image information received at the reception portion; and control portion that combines the image information received at the reception portion to form one file and controls the storage portion to store the file after detecting transmission completion at the transmission portion, when the input error does not occur, and controls the storage portion to delete the image information which has been stored based on the instruction to delete and controls the storage portion to store the one filed image information which is received at the reception portion after the input error occurred.

BRIEF DESCRIPTION OF THE DRAWINGS

FIG. 1 is a block diagram showing an exemplary schematic configuration of a system including an image processing apparatus according to an embodiment of the present invention;

FIG. 2A and FIG. 2B are diagrams for explaining timings of processing for scanning/storing/transmitting of image information in the image processing apparatus of FIG. 1 using data flow of each page;

FIG. 3 is a diagram for explaining stop timings of processing for scanning/storing/transmitting at the time of occurrence of a paper jam error in processing of FIG. 2B using data flow for each page;

FIG. 13 is a diagram for explaining a sequence at the time of occurrence of a paper jam error in transmitting processing in processing of FIG. 11.

PREFERRED EMBODIMENTS OF THE INVENTION

Figure 4:
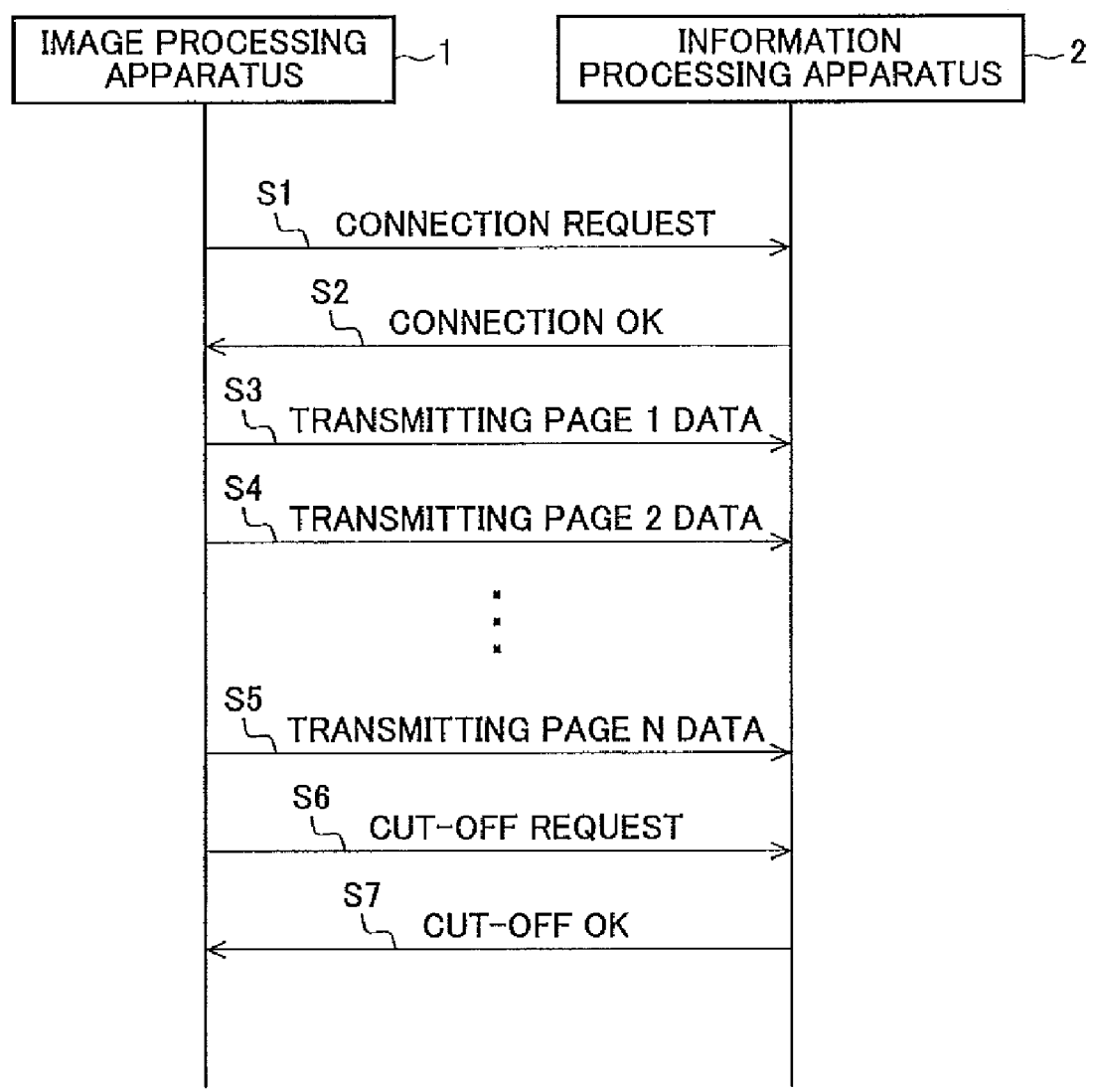
FIG. 4 is a diagram for explaining an example of a sequence of transmitting processing in processing of FIG. 2B.

FIG. 1 is a block diagram showing an exemplary schematic configuration of a system including an image processing apparatus according to an embodiment of the present invention. The system shown in FIG. 1 has an image processing apparatus 1 and an information processing apparatus 2 that are connected to each other. As the image processing apparatus 1, a multi-functional peripheral, a scanner apparatus and the like are applicable, and as the information processing apparatus 2, a server computer and the like such as a general-purpose personal computer (PC) and an application server are applicable.

The image processing apparatus 1 is provided with a device control portion 10, an operation portion 11, an image reading portion 12, an information storage portion 13, an image transmission portion 14 and a communication portion 15. The device control portion 10 controls each portion provided in the image processing apparatus 1. The operation portion 11 includes an input portion 11a and a display portion 11b such as an LCD (Liquid Crystal Display). The input portion 11a includes groups of various input keys and a touch panel provided in the display portion 11b for receiving user input.

The image reading portion 12 is an example of the input portion that inputs image information, and reads a document placed on a document table or an automatic document feeder to input image information. Note that, the image information read at the image reading portion 12 is explained as an object of input, however, image information transmitted from other devices through the communication portion 15 or the like may also be an object of input, and in such a case, the following explanation is applicable by replacing a paper jam error with a reception error.

The information storage portion 13 is composed of an HDD, an image memory or the like, and stores image information input from the image reading portion 12. The image transmission portion 14 transmits the image information stored in the information storage portion 13 through the communication portion 15. The communication portion 15 is composed of a communication adapter and the like, and communicates with the information processing apparatus 2 through a network such as a wired LAN (Local Area Network) and a wireless LAN. The image transmission portion 14 and the communication portion 15 are examples of the transmission portion that transmits image information stored in the information storage portion 13. A transmitting method is not particularly limited.

On the other hand, the information processing apparatus 2 is composed of a communication adapter and the like, and provided with a communication portion 20 that performs communication with the communication portion 15, an information storage portion 21 that stores image information received through the communication portion 20 and an application program (application software) 22 that processes the image information stored in the information storage portion 21. Note that, hereinafter, the application program is simply referred to as "application". The communication portion 20 is an example of the reception portion that receives the image information transmitted from the image processing apparatus 1, and the information storage portion 21 is composed of an HDD and the like and is an example of a storage portion that stores image information received in the reception portion.

An outline of processing in such a system is simply described blow; a user performs to set scanning and gives an instruction to start execution at the operation portion 11 of the image processing apparatus 1, and the device control portion 10 that receives input gives a reading instruction to the image reading portion 12, and thereby image information is input. The input image information is once saved in the information storage portion 13, for which the image transmission portion 14 performs control concerning image transmission, and transmitted to the information processing apparatus 2 through the communication portion 15. The information processing apparatus 2 receives the image information that is transmitted from the image processing apparatus 1 at the communication portion 20 to save in the information storage portion 21. The saved data is used by the application 22.

Description will be given for main characteristics of the present invention in such a system. The device control portion in the present invention basically performs parallel processing for input, storage and transmission of image information. The device control portion 10 is an example of the control portion that processes input at the image reading portion 12, storage at the information storage portion 13 and transmission at the image transmission portion 14 and the communication portion 15 in parallel.

On the other hand, the device control portion 10 in the present invention, in the case where an input error occurs in the middle of inputting image information by the image reading portion 12, controls the image transmission portion 14 to transmit an instruction to delete information that has already been transmitted to a transmission destination and combines the image information before the input error occurs with the image information input at the image reading portion 12 after the input error occurred to form one file, and then, controls the image transmission portion 14 to retransmit it.

The information processing apparatus 2 relates to such control in the image processing apparatus 1, and provided with the following control portion. The control portion of the information processing apparatus 2, when an input error does not occur, combines the image information received at the communication portion 20 to form one file and controls the information storage portion 21 to store the file after detecting transmission completion concerning transmission through the communication portion 15 of the image transmission portion 14. The image information may be stored in a buffer until being formed in one file. The control portion of the information processing apparatus 2, when the input error occurs, deletes the image information that has been stored in the information storage portion 21 based on an instruction to delete and controls the information storage portion 21 to store the image information which is received at the communication portion 20 and formed in one file after the input error occurred.

The control portion of the information processing apparatus 2 is composed of an application 22 and a storage region thereof, a CPU (Central Processing Unit) for executing the application 22, a RAM (Random Access Memory) that is an operation region and the like, and the control as described above is a control that is mainly characterized by content of the application 22.

Here, a preferable example is given for cooperation of functions of the application 22 in the device control portion 10 of the image processing apparatus 1. The device control portion 10 exchanges device control information with the application 22 along with transmission of operation panel information in the operation portion 11 to the side of information processing apparatus 2 through the communication portion 15 and the communication portion 20, while invokes the function of the application 22 (referred to as an external application function) to obtain a processing result thereof. This makes it possible to perform processing that cooperates with the application 22 (processing for realizing the external application function) concerning transmission of image information.

The above-described operation panel information and device control information are transmitted including device information of a device on a transmission side such that the reception side is able to recognize a transmission source. The device information is unique information to a device, and refers to identifying information for enabling identification from other devices. An example for the image processing apparatus 1 is described below; the device information is identifying information for identifying the image processing apparatus 1 from other devices (other image processing apparatus and the like), and for example, a device number (serial number), a MAC (Media Access Control) address and the like that are unique to the image processing apparatus 1 are included.

Further, it is preferable to perform exchange of information between the image processing apparatus 1 and the application 22 on the basis of a standard network technology on the points that many common tools and skills are used for development of cooperation parts of the application 22 and the device control portion 10 of the image processing apparatus 1 (firmware in the device control portion 10) and mounting is simple.

Concerning control at the image processing apparatus 1 and the information processing apparatus 2 in the present invention described above, first, description will be given for processing for scanning/storing/transmitting that is executed in the image processing apparatus 1 in reference to FIG. 2A and FIG. 2B. FIG. 2A and FIG. 2B are diagrams for explaining timings of the processing for scanning/storing/transmitting of image information in the image processing apparatus of FIG. 1 using data flow of each page. FIG. 2A shows an example for performing transmitting processing after parallel processing for scanning/storing is completed, and FIG. 2B shows an example to perform processing for scanning/storing/transmitting by parallel processing. FIG. 2A and FIG. 2B both illustrate processing at the image processing apparatus 1 when N sheets of a document are read.

In the processing illustrated in FIG. 2A (hereinafter, referred to as processing A), an image read at the image reading portion 12 is stored in the information storage portion 13, and reading of all pages of a document are completed, and thereafter, is formed in file to be transmitted. In the processing A, since image information is not transmitted until completion of reading the document, even when an error such as paper jam occurs, it is possible to restart from the midstream by cancelling the error, however, there is an issue that it takes an immense amount of time to read and transmit the documents when there are a large amount of documents.

In the processing illustrated in FIG. 2B (hereinafter, referred to as processing B), an image read at the image reading portion 12 is stored in the information storage portion 13, and image information is transmitted page by page. Since a timing to start transmission quickens compared to the processing A by employing the processing B, a total time required for processing for scanning execution can be considerably reduced (reduced by time Tr) and the larger the amount of the document is, the more remarkable effects are expectable for the reduced time Tr.

In the image processing apparatus 1 according to the present invention, as described above, the processing B is executed in normal times (at the time of occurring no paper jam errors), and the processing A is executed when a paper jam error occurs. Description will be given for flow that switches to the processing A in the case where a paper jam error occurs at the time of executing the processing B in reference to FIG. 3 to FIG. 8.

First, description will be given for processing in the image processing apparatus 1 when a paper jam error occurs in reference to FIG. 3. FIG. 3 is a diagram for explaining stop timings of processing for scanning/storing/transmitting when the paper jam error occurs in processing of FIG. 2B using data flow for each page.

As shown in FIG. 3, when a paper jam error occurs while reading the fourth sheet of a document (P4), reading is normally completed up to the third sheet of the document (P3), therefore, image information up to P3 is stored in the information storage portion 13, and the image information up to P3 is transmitted by the image transmission portion 14.

Description will be given for operation after a paper jam error occurred. After the paper jam error occurred, it is considered that transmission of image information is interrupted until the error is cancelled. However, normally, a communication session is established when the image processing apparatus 1 and the information processing apparatus 2 perform transmission/reception of image information, and a time-out occurs when either of communication is retarded for a given time and communication session is discarded. Therefore, transfer can not be interrupted with the communication session established without limitation until a user performs recovery from the error. Description will be specifically given for this by using FIG. 4.

FIG. 4 is a diagram for explaining an example of a sequence of transmitting processing in the processing of FIG. 2B. In the processing B, before image information is transmitted to the information processing apparatus 2 by the image transmission portion 14, the image processing apparatus 1 gives a connection request to the information processing apparatus 2 (step S1). The image processing apparatus 1, at the time when received a reply of a connection OK from the information processing apparatus 2 (step S2), that is, at the time when the connection to the information processing apparatus 2 is completed, is able to transmit image information, and transmits the image information of each page (steps S3 to S5). When the image processing apparatus 1 completes transmission of the image information, the image processing apparatus 1 gives a cut-off request to the information processing apparatus 2 (step S6). In response to this, the information processing apparatus 2 returns a reply of cut-off OK, and cut-off is completed at the time of receiving this (step S7).

In such a sequence of transmitting processing, when a paper jam error as shown in FIG. 3 occurs, data of image information up to the third sheet of a document (P3) is transmitted, however, data of image information of and after the fourth sheet is not transmitted. At this time, the information processing apparatus 2 is ready for receiving data from the image processing apparatus 1, however, it is impossible to notice that a reason why data is not transmitted is because the image processing apparatus 1 deliberately retards or because a communication error causes no transmission. The number of communication sessions that the information processing apparatus 2 is able to establish is limited, a session in a state of no replies is not normally kept establishing without limitation for load reduction, and as a result, a session is discarded.

Therefore, the image processing apparatus 1 takes any one of methods, (I) to complete a series of processing at the time when data up to a page that is read (the third sheet of a document in this example) is transmitted, (II) to give an instruction to the information processing apparatus 2 to discard the transmitted data and to let a user to execute a scan again from the beginning, (III) to give an instruction to the information processing apparatus 2 to discard the transmitted data and to let a user to execute a scan again from a page where a paper jam occurred, and (IV) as described later for an example, to let a user to execute a scan again from a page where a paper jam occurred, and to be combined on the side of the information processing apparatus 2. Among them, processing of the above-described (III) is employed in the present invention. Of course, it may be selectable by a user operation so as to perform the processing of the above-described (I), the processing of the above-described (II) and the processing of the above-described (IV).

Figure 5:
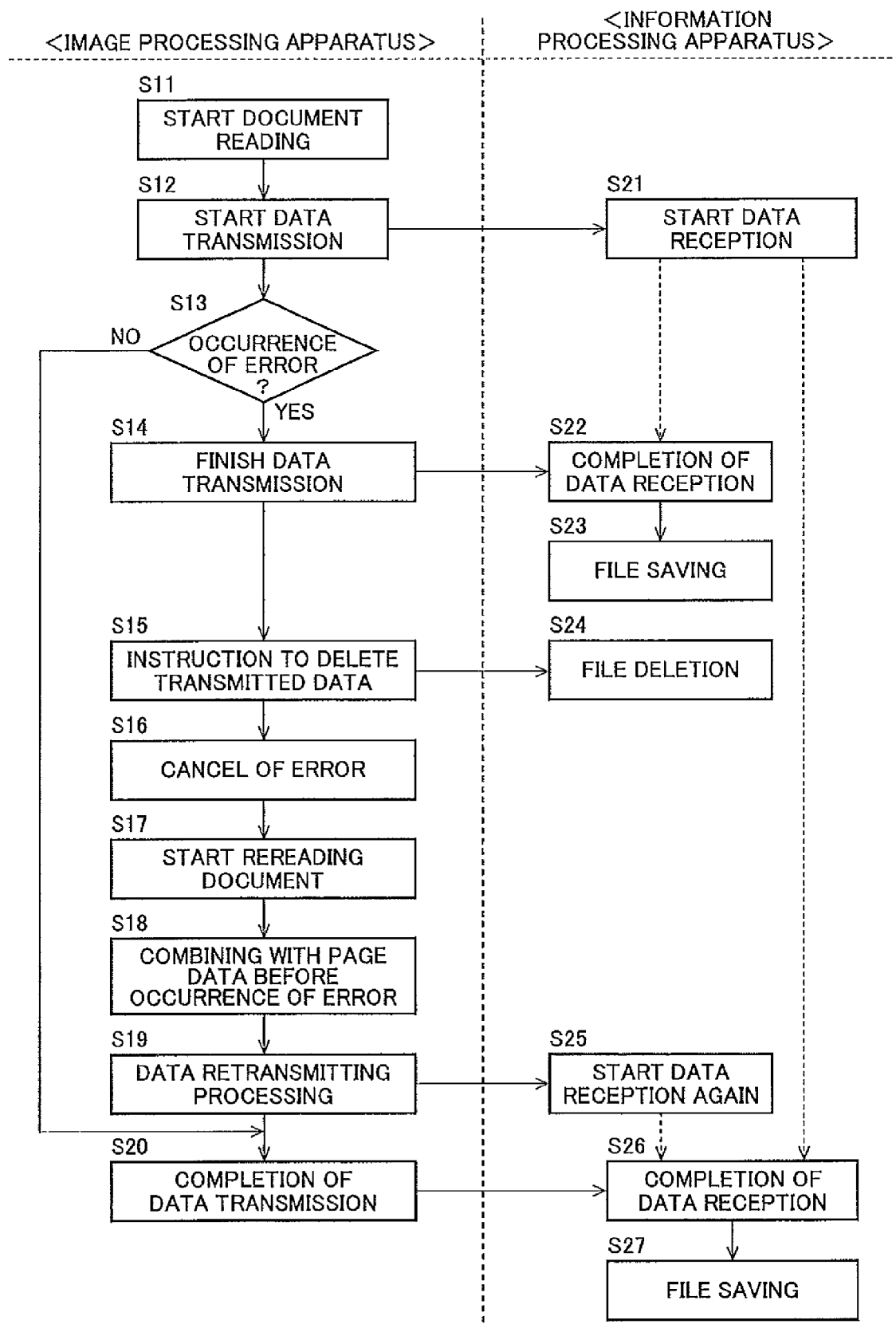
FIG. 5 is a flow chart for explaining an example of processing which enables the processing of FIG. 2B to deal with an occurrence of a paper jam error.
Figure 6:
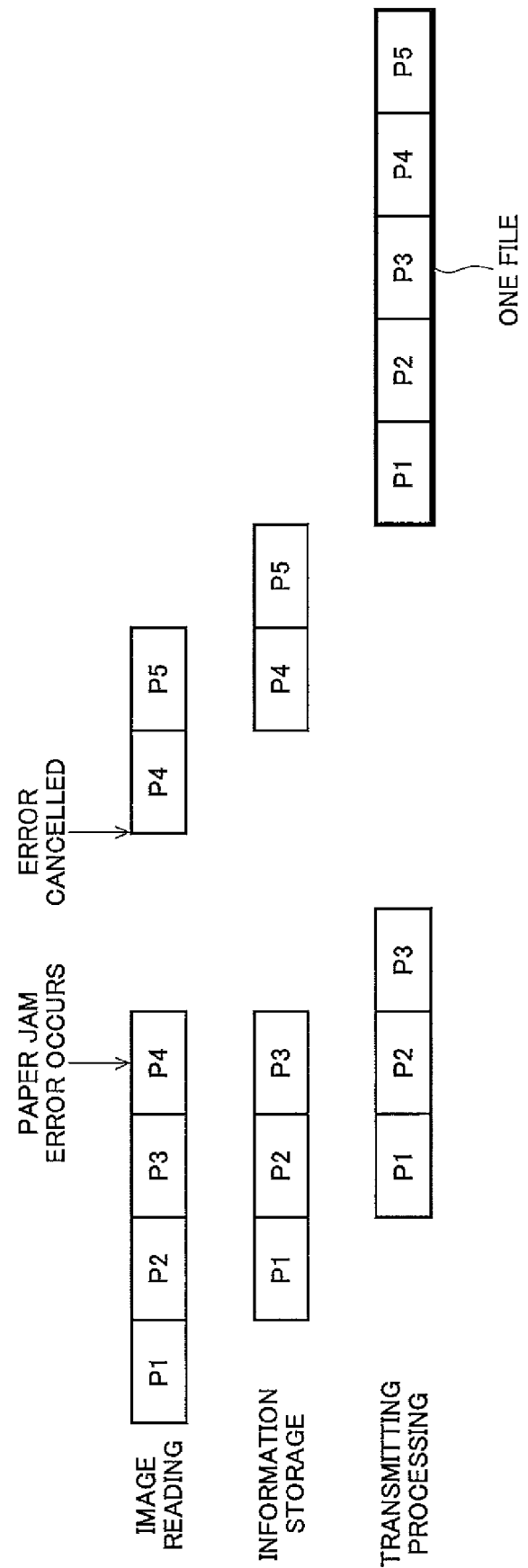
FIG. 6 is a diagram for explaining timings of processing for scanning/storing/transmitting after an error is cancelled using data flow for each page in processing of FIG. 5.
Figure 7:
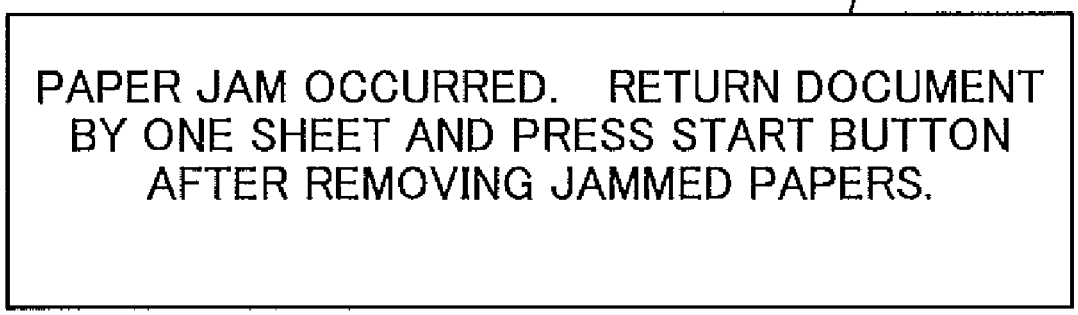
FIG. 7 is a diagram showing an example of an error message displayed on a display portion at the time of occurrence of a paper jam error in processing of FIG. 5.

Description will be given for processing including processing of the above-described (III) in reference to FIG. 5 to FIG. 7. FIG. 5 is a flow chart for explaining an example of processing which enables processing of FIG. 2B to deal with an occurrence of a paper jam error. FIG. 6 is a diagram for explaining timings of processing for scanning/storing/transmitting after an error is cancelled using data flow for each page in the processing of FIG. 5, and the flow until occurrence of a paper jam error is the same as that in FIG. 3. Additionally, FIG. 7 is a diagram showing an example of an error message to be displayed on the display portion when a paper jam error occurs in the processing of FIG. 5.

First, document reading is started in the image processing apparatus 1 (step S11), thereafter, transmission of image information is started for each page reading (step S12). The image processing apparatus 1 notifies the information processing apparatus 2 that the image information is transmitted page by page at the time of starting transmission. After the step S12, a sub-process program provided in the image processing apparatus 1 (device control portion 10 or the like) executes actual document reading and transmission, and the sub-process program notifies a main process program that executes the flow explained here of the information of occurrence of a paper jam error.

The image processing apparatus 1, in the case of no occurrence of a paper jam error during transmission (in the case of NO at a step S13), finishes normally to complete transmission, and issues completion notification to the information processing apparatus 2 (step S20).

On the other hand, when notification of occurrence of a paper jam error is received from the sub-process program (in the case of YES at the step S13), transmission up to a page before a jam error occurs is completed to finish the transmission, notification of finish is issued to the information processing apparatus 2 (step S14), and an instruction to delete the transmitted data is transmitted to the information processing apparatus 2 (step S15).

Further, when a paper jam error occurs, a message urging a user to cancel the error, for example, a message such as a message 30 of FIG. 7, is presented by displaying it on the display portion 11b. After the user cancels the error such as a paper jam or the like (step S16), when the user presses a start button on the input portion 11a of the operation portion 11, reading of the document is started again (step S17).

From here, as shown by data after an error is cancelled in FIG. 6, the above-described processing A is applied. That is, when an error is cancelled and reading of a document is restarted, the image transmission portion 14 obtains image information that has been read from the information storage portion 13, which is combined with the image information similarly stored in the information storage portion 13 by rereading to form one file (step S18). Then, the image transmission portion 14 starts transmission of the one filed data (step S19). In an example of FIG. 6, the image transmission portion 14 obtains data of image information P1 to P3 from the information storage portion 13, combines it with data of image information P4 and P5 of the document newly read to form one file, and starts transmission. At the step S19, first, the image processing apparatus 1 notifies the information processing apparatus 2 that all image data are transmitted by forming them in one file, then starts transmission. Thereafter, the transmission is completed, and notification of completion is issued to the information processing apparatus 2 (step S20).

On the other hand, the information processing apparatus 2 receives image information transmitted at the step S12 page by page (step S21). The information processing apparatus 2 combines a plurality pieces of image information after completing transmission into one file, for example, in a multi-page PDF (Portable document Format) or a multi-page TIFF format (Tagged Image File Format).

That is, at the time of finishing normally, the information processing apparatus 2 completes reception by means of notification of transmission completion of the step S20 (step S26). The information processing apparatus 2, stores the data received so far by forming them in one file when the reception is completed (step S27).

On the other hand, in the case of accompanying occurrence of a paper jam error, the information processing apparatus 2 completes reception by means of the notification of finishing transmission of the step S14 (step S22). The information processing apparatus 2 stores the data received so far by forming them in one file when the reception is completed (step S23). Accordingly, in the examples of FIG. 3 and FIG. 6, a file combined as one file including data up to the page 3 is made in the information processing apparatus 2 at this time and stored in the information storage portion 21. Next, the information processing apparatus 2, when receiving an instruction of the step S15, that is, a request for deleting a file from the image processing apparatus 1, deletes the stored file (step S24).

The information processing apparatus 2, when receiving notification from the image processing apparatus 1 that image information is transmitted by forming it in one file after recovering from an error at the step S19, starts receiving the image information as one file (step S25). The information processing apparatus 2 finishes the reception by means of the reception of notification of transmission completion at the step S20 (step S26). Thereafter, the received data is stored as one file (step S27). In this way, the received data is formed in one file after recovering from an error, and thus stored as it is.

Figure 8:
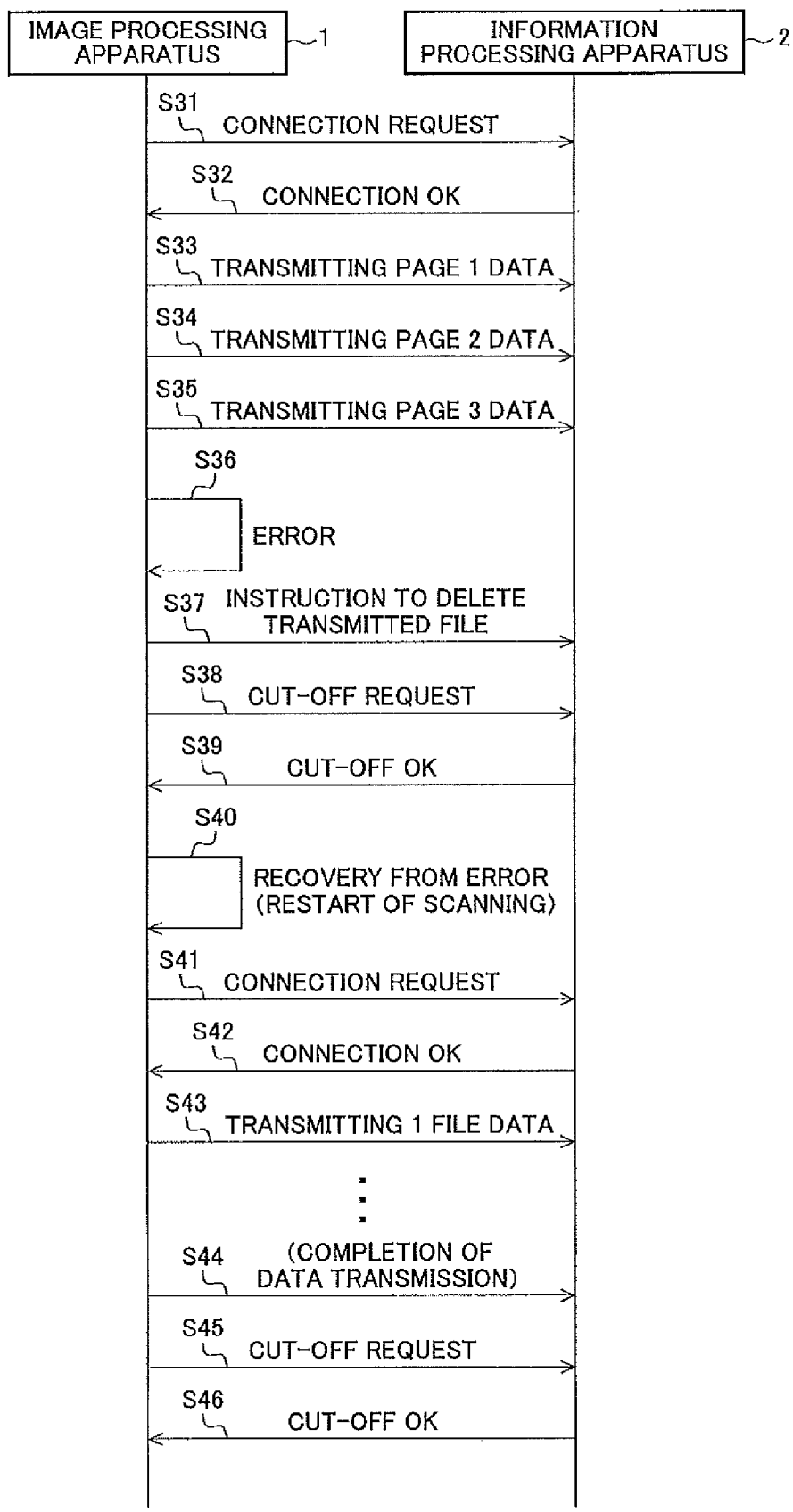
FIG. 8 is a diagram for explaining an example of a sequence at the time of occurrence of a paper jam error in transmitting processing in processing of FIG. 5.

Next, in reference to FIG. 8, description will be given for an example of a sequence of image transmission at the time of processing such as that of FIG. 6. FIG. 8 is a diagram for explaining an example of a sequence at the time of occurrence of a paper jam error (that is, when performing processing such as that of FIG. 6) in transmitting processing shown in FIG. 5.

When transfer is started, the image processing apparatus 1 gives a connection request to the information processing apparatus 2 (step S31), and the information processing apparatus 2 returns a connection OK (step S32). The connection may be either a case where two connections for transfer and for control of data are performed such as FTP (File Transfer Protocol) or a case where connection is completed by one connection request such as HTTP (Hypertext Transfer Protocol) POST.

At the time when receiving a reply of a connection OK from the information processing apparatus 2, that is, once the connection is completed, the image processing apparatus 1 is capable of transmitting image information and starts to transmit the image information of each page (steps S33 to S35). In FIG. 6, since the paper jam error occurs at the time of reading the fourth page, page data up to the third sheet has been transmitted to the information processing apparatus 2. When the paper jam error occurs (step S36), the image processing apparatus 1 finishes the data transfer. At this time, a file including the data up to page 3 is made in the information processing apparatus 2. Then, the image processing apparatus 1 transmits a deletion request (instruction to delete) of the file along with notification of finishing of data transfer, and deletes the transmitted file in the information processing apparatus 2 temporarily in order to perform retransmitting of the data of the entire pages after cancelling the error (step S37). After the instruction to delete, or along with the instruction to delete, the image processing apparatus 1 issues a request for cutting off the connection with the information processing apparatus 2 (step S38), and the information processing apparatus 2 returns a cut-off OK in response to the request (step S39).

When a user cancels the error and starts to read by scanning (step S40), the image processing apparatus 1 reads image information P1 to P3 which has been stored in the information storage portion 13 to perform filing by combining it with the data read after restarting from the error. Thereafter, the image processing apparatus 1 gives a connection request to the information processing apparatus 2 (step S41), and performs transmission of data which is formed in one file upon the reception of a reply of a connection OK (step S42) after performing the connection with the information processing apparatus 2 (step S43). When the transfer is completed normally (step S44), the image processing apparatus 1 issues a cut-off request (step S45), and cuts off the connection when receiving a reply of a cut-off OK (step S46).

As description has been made hereinabove, in the image processing method in this system, when the paper jam error occurs, since the image information up to the time when the paper jam error has occurred is transmitted in parallel processing such as processing B as described above, the image processing apparatus 1 transmits an instruction to delete the transmitted image information up to the time of occurrence of the paper jam error to a transmission destination (information processing apparatus 2 in this example). Then, the image processing apparatus cancels the error and performs the processing for combining page data up to the time of occurrence of the paper jam error with data under reading after restarting to read a document. Conventionally, when a paper jam occurs even once during transmission of a large amount of documents, the transmission is started again from the beginning, however, in the present invention, it is possible to restart a job from the middle of a job without losing the performance and the operability of the user is considerably improved. In addition, communication efficiency is improved when controlling to transmit/receive as one file in retransmitting, since the data for indicating partitions of pages is not necessary, compared with transmitting the data from the transmission side page by page and combining the data in one file on the reception side.

Figure 9:
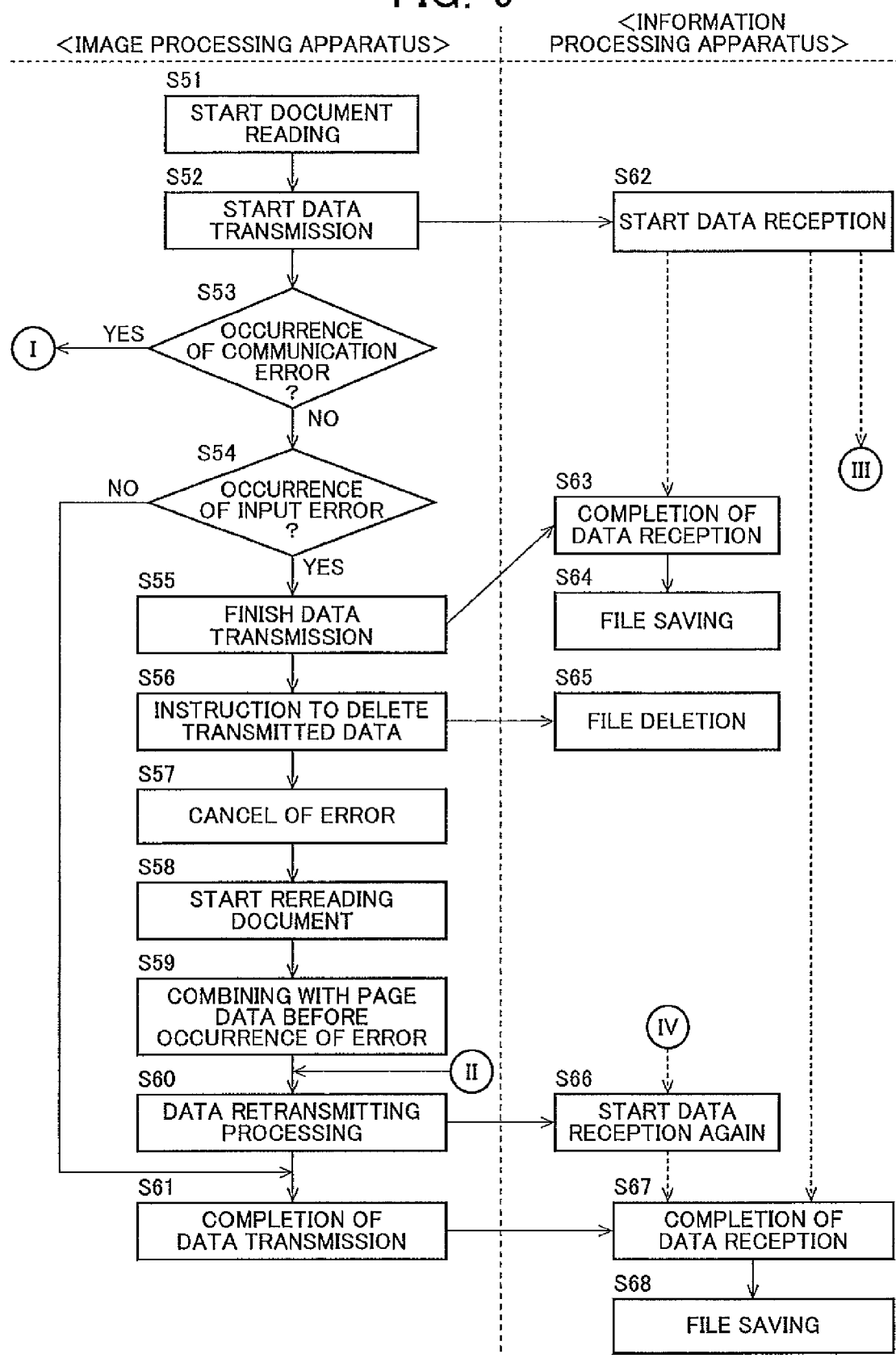
FIG. 9 is a flow chart for explaining another example of processing which enables the processing of FIG. 2B to deal with an occurrence of a paper jam error.
Figure 10:
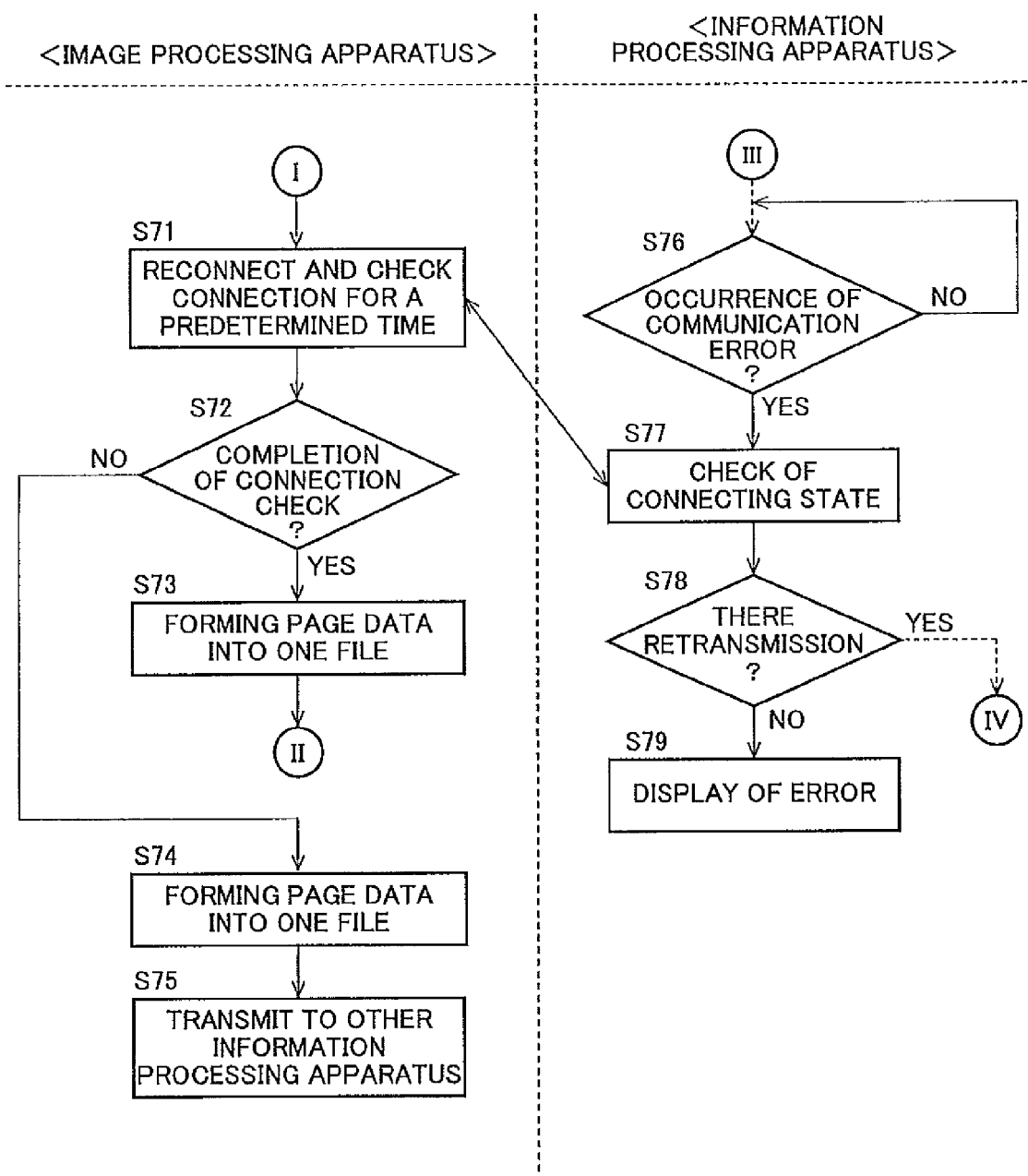
FIG. 10 is a flow chart following after FIG. 9.

FIG. 9 and FIG. 10 are flow charts for explaining another example of processing which enables the processing of FIG. 2B to deal with an occurrence of a paper jam error. Note that, in FIG. 9, steps S51, S52, S54 to S68 respectively correspond to steps S11, S12, S13 to S27 in FIG. 5, and the detail has been described above, and further, the sequence can also be described by adding the example of the sequence of FIG. 8 appropriately. Hereinbelow, for simplification of the description, description will be given only for a difference from the processing described in FIG. 5.

On the side of the image processing 1, document reading by a sub-process program of the image processing apparatus 1 is continued irrespective of presence/absence of communication error occurrence. When detecting the communication error occurrence in transmitting data (in the case of YES at a step S53), the image processing apparatus 1 reconnects to the information processing apparatus 2, and thereafter, performs checking of connecting state (repeating of transmitting and receiving of data for checking) for a predetermined time (step S71). Processing on the side of the information processing 2 corresponding to the step S71 is processing of the step S77 when a communication error occurs at the step S76 (in the case of YES).

When it is checked that the communication is good for a predetermined time (in the case of YES at a step S72), combining page data is performed to form one file (step S73), and the flow shifts to the step S60 to retransmit. When the communication error occurs in the middle of the checking at the step S71 (in the case of NO at the step S72), combining page data is performed to form one file (step S74), and the file is retransmitted to other information processing apparatus (step S75). A transmission destination address of the other information processing apparatus may be designated in advance, or displayed on a dialogue screen for requesting input to a user immediately before starting the step S75 for receiving the input.

On the side of the information processing apparatus 2, during receiving data, the sub-process program for detecting communication error occurrence is processed in parallel, and when detecting occurrence of a communication error (in the case of YES at a step S76), checking of a connecting state with the image processing apparatus 1 is performed (step S77), and when it is checked that the connection is good for a predetermined time and retransmission is performed (in the case of YES at a step S78), the flow shifts to the step S66 to receive retransmission at the step S60 which is continued from the step S73 of the image processing apparatus 1. When it is not checked that retransmission is performed (in the case of NO at the step S78), the processing is finished by displaying an error (step S79).

Hereinabove, as description has been made such that processing to be executed is made different between the case of YES at the step S53 and the case of YES at the step S54, it is preferable for the device control portion 10 to perform different recovery processing after an error for an input error and for other type of errors, respectively. The image processing apparatus 1 is capable of switching the recovery processing after an error corresponding to a type of an error occurred, and thereby capable of performing optimum recovery processing corresponding to the type of an error.

As description has been made at the steps S71 and S77, when the other type of errors is the communication error, it is preferable for the device control portion 10 to retransmit at the image transmission portion 14 and the communication portion 15 after checking the communication state (connecting state) for a predetermined time with the information processing apparatus 2 which is a transmission destination. As described above, retransmission may be performed only when it can be checked that the communication state is better than a predetermined level for a predetermined time. When the error is the communication error, the image processing apparatus 1 is able to retransmit after checking the communication state with the information processing apparatus 2 for a predetermined time, and thereby it is possible to prevent that an error occurs again when performing retransmission in an unstable communication state.

Furthermore, as described at the step S75, when the communication with the transmission destination is not established again, it is preferable for the device control portion 10 to transmit at the image sending portion 14 and the communication portion 15 by designating a second transmission destination. It is preferable that this transmission is also applied when the communication state does not become good after being checked for a predetermined time. When the image processing apparatus 1 is not able to establish the communication with the information processing apparatus 2 again, it is able to transmit by designating a second information processing apparatus such as an individual PC of a user, and thereby, it does not need the operation of rereading because the document data is saved by saving the scanned document data that has been already read in other apparatus such as an individual PC of a user.

Hereinafter, as a reference, description will be given to the other image processing method related to the present invention based on the configuration example of FIG. 1 referring to FIG. 11 to FIG. 13. The image transmitting method described here is, in the above-described processing, the image processing apparatus 1 does not instruct deletion at the time of occurrence of a paper jam error, and combines image information transmitted after cancelling the error with the image information that has been transmitted before the occurrence of the paper jam error on the side of the information processing apparatus 2 to form them in one file. Note that, also in this image processing method, the above-described parallel processing of the processing B is a basis.

Figure 11:
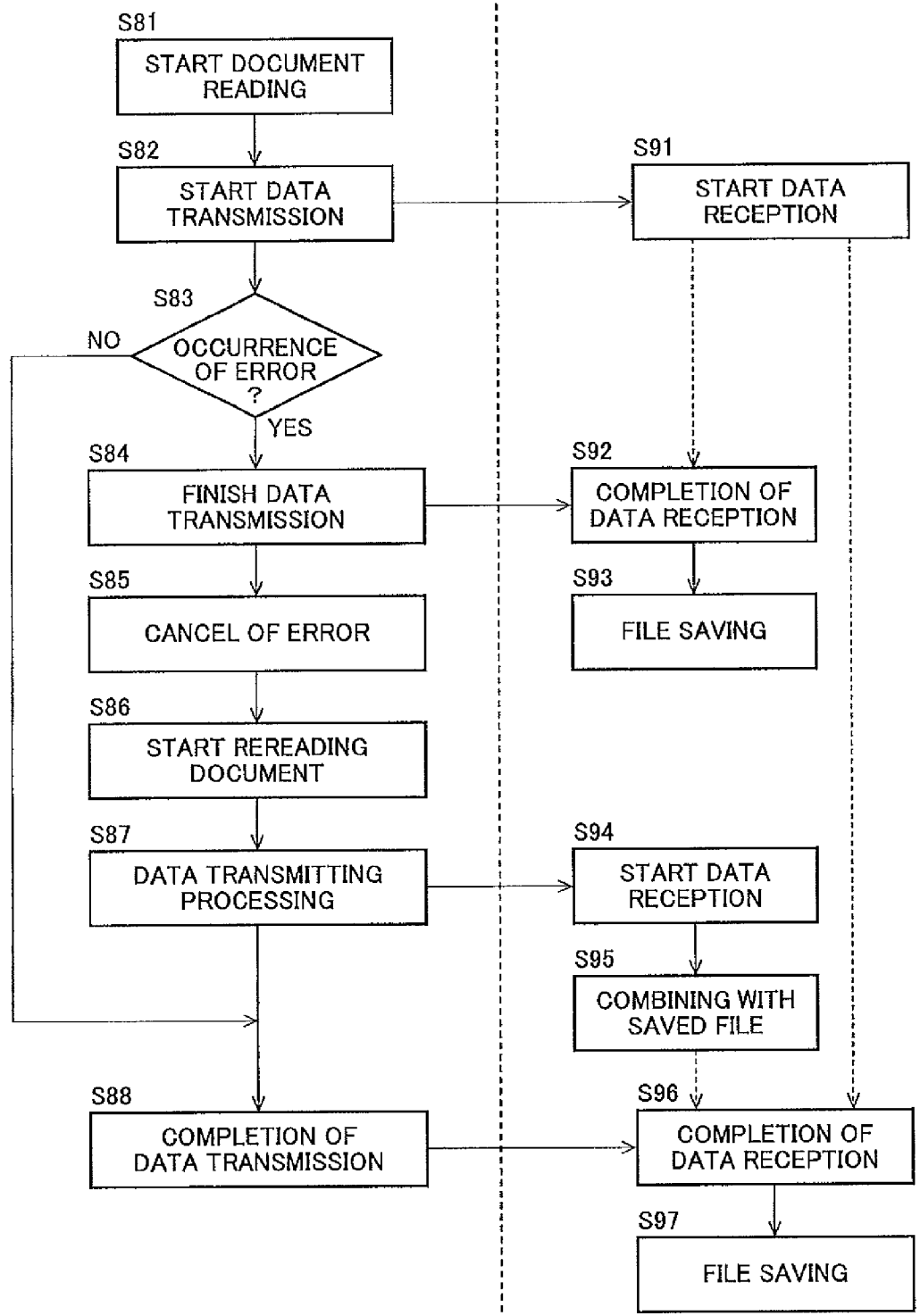
FIG. 11 is a flow chart for explaining a reference of processing which enables the processing of FIG. 2B to deal with an occurrence of a paper jam error.

FIG. 11 is a flow chart for explaining an example of processing which enables the processing of FIG. 2B to deal with an occurrence of a paper jam error. FIG. 12 is a diagram for explaining timings of processing for scanning/storing/transmitting after cancelling an error in processing of FIG. 11 as page by page data flow, and is the same as that shown in FIG. 3 until the occurrence of the paper jam error.

First, document reading is started in the image processing apparatus 1 (step S81), thereafter, transmission of image information is started for each page reading (step S82). The image processing apparatus 1 notifies the information processing apparatus 2 at the time of starting transmission that the image information is transmitted page by page. After the step S82, a sub-process program provided in the image processing apparatus 1 (device control portion 10 or the like) executes actual document reading and transmission, and the sub-process program notifies a main process program that executes the flow explained here of the information of occurrence of a paper jam error.

When no paper jam error occurs in transmission (in the case of NO at a step S83), the image processing apparatus 1, normally finishes to complete the transmission, and issues notification of completion to the information processing apparatus 2 (step S88).

On the other hand, when notification of occurrence of a paper jam error is received from the sub-process program (in the case of YES at step S83), the image processing apparatus 1 finishes the transmission by completing transmission the pages that have been received before the occurrence of the jam error and issues the notification of finishing to the information processing apparatus 2 (step S84). At the step S84, in order to be associated with the image information after cancelling the paper jam error, a unique identifier (ID) is made and transmitted to the information processing apparatus 2. Furthermore, the image information of the page which has been completed transmission at the step S84 is deleted from the information storage portion 13.

Further, when a paper jam error occurs, a message urging a user to cancel the error, for example, a message such as a message 30 of FIG. 7, is presented by displaying on the display portion 11b. After the user cancels the error by resolving a paper jam or the like (step S85), when the user presses a start button on the input portion 11a of the operation portion 11, rereading of the document is started (step S86).

When reading of the document is restarted, the image transmission portion 14 obtains the image information which has been stored in the information storage portion 13 by rereading and starts the transmission (step S87). In the example of FIG. 12, the image transmission portion 14 has already completed the transmission of the data of the image information P1 to P3 before occurrence of a paper jam error, and reads data of the image information P4 and P5 of the document one after another to transmit. Thereafter, the transmission is completed and the notification of completion is issued to the information processing apparatus 2 (step S88). At the step S87 or the step S88, in order to be associated with the image information before the occurrence of paper jam error, a unique identifier (ID) is made to transmit to the information processing apparatus 2. At this time, although combining may be performed by the information processing apparatus 2 based on an instruction to combine that is transmitted to the information processing apparatus 2, the combining may be executed on the side of the information processing apparatus 2 in its judgment without transmitting such an instruction. The two identifiers transmitted to the information processing apparatuses 2 before and after occurrence of a paper jam error may be completely the same or may be different ones, only if the information processing apparatus 2 can discriminate that they are associated with each other by including a common character string, for example.

On the other hand, the information processing apparatus 2 receives the image information which has been transmitted at the step S82 page by page (step S91). The information processing apparatus 2 combines a plurality of image information after completion of transmission into one file in the multi-page PDF format, the multi-page TIFF format, or the like.

That is to say, when normally finishes, the information processing apparatus 2 completes the reception due to the notification of finishing of transmission at the step S88 (step S96). When the reception is completed, the information processing apparatus 2 saves the data received so far by making it one file (step S97).

On the other hand, in the case of accompanying occurrence of a paper jam error, the information processing apparatus 2 completes reception due to the notification of finishing of transmission of the step S84 (step S92). The information processing apparatus 2, when the reception is completed, forms the data received in one file to save (step S93). Accordingly, in the examples of FIG. 3 or FIG. 12, a file combined as one file including data up to the page 3 is formed in the information processing apparatus 2 at this time, and saved in the information storage portion 21 by being associated with the identifier.

The information processing apparatus 2 starts to receive the image information and the identifier transmitted from the image processing apparatus 1 after recovery from the error at the step S87 (step S94). The information processing apparatus 2 opens up the file which has been already saved in the information storage portion 21 corresponding to the received identifier, and combines it with the image information received here (step S95). Combining may be repeated for each image information of the received page. Then, the information processing apparatus 2 completes the reception by receiving the notification of completion of transmission at the step S88 (step S96). Thereafter, the received data is saved as one file (step S97). Note that, the combining (merging) at the step of S95 may be executed at one time after completion of reception at the step S96, not being executed one after another for each page.

Note that, in a case where the image processing apparatus 1 is reset and interrupted after occurrence of a paper jam error, the identifier is nullified and not transmitted, therefore, even though an irrelevant other document is transmitted after resetting, there will be no merging with the transmitted file. Furthermore, when the image information of an identifier corresponding to the saved identifier is not received after a lapse of a predetermined time, the information processing apparatus 2 may be set to delete the identifier and the file from the information storage portion 21.

Next, in reference to FIG. 13, description will be given for an example of a sequence of image transmission at the time of processing such as that of FIG. 12. FIG. 13 is a diagram for explaining transmitting processing in processing of FIG. 11, which is an example of a sequence at the time of occurrence of a paper jam error (that is, when performing processing such as that of FIG. 12).

When transfer is started, the image processing apparatus 1 gives a connection request to the information processing apparatus 2 (step S101), the information processing apparatus 2 returns a connection OK (step S102). The connection may be either a case where two connections for transfer and for control of data are performed such as FTP or a case where connection is completed at one time connection request such as HTTP POST.

At this time when receiving a reply of a connection OK from the information processing apparatus 2, that is, once the connection is completed, the image processing apparatus 1 is capable of transmitting image information, and starts to transmit the image information of each page (steps S103 to S105). In FIG. 12, since the paper jam error occurs at the time of reading the fourth page, page data up to the third sheet has been transmitted to the information processing apparatus 2. When the paper jam error occurs (step S106), the image processing apparatus 1 finishes the data transfer. At this time point, a file including the data up to the page 3 is made in the information processing apparatus 2. The image processing apparatus 1 issues a request for cutting off the connection with the information processing apparatus 2 after transmitting the identifier (step S107), and the information processing apparatus 2 returns a cut-off OK in response to that (step S108). At this time, the information processing apparatus 2 saves the received identifier in the information storage portion 13 by associating it with the file which has been stored.

When a user cancels the error and starts reading by scanning (step S109), the image processing apparatus 1 stores image information of the document P4 and P5 in the information storage portion 13 one after another by rereading that. The image processing apparatus 1 gives a connection request to the information processing apparatus 2 (step S110), receives the reply of a connection OK (step S111), and thereby transmit the image information of the stored P4 and P5 with the identifier one after another after performing connection with the information processing apparatus 2 (steps S112 and S113). When the transfer is completed normally, the image processing apparatus 1 issues a cut-off request (step S114), and cuts off the connection when receiving a reply of a cut-off OK (step S115). The information processing apparatus 2 combines the received image information with the file stored in the information storage portion 21 based on the identifier to form one file and saves it in the information storage portion 21.

Figure 12:
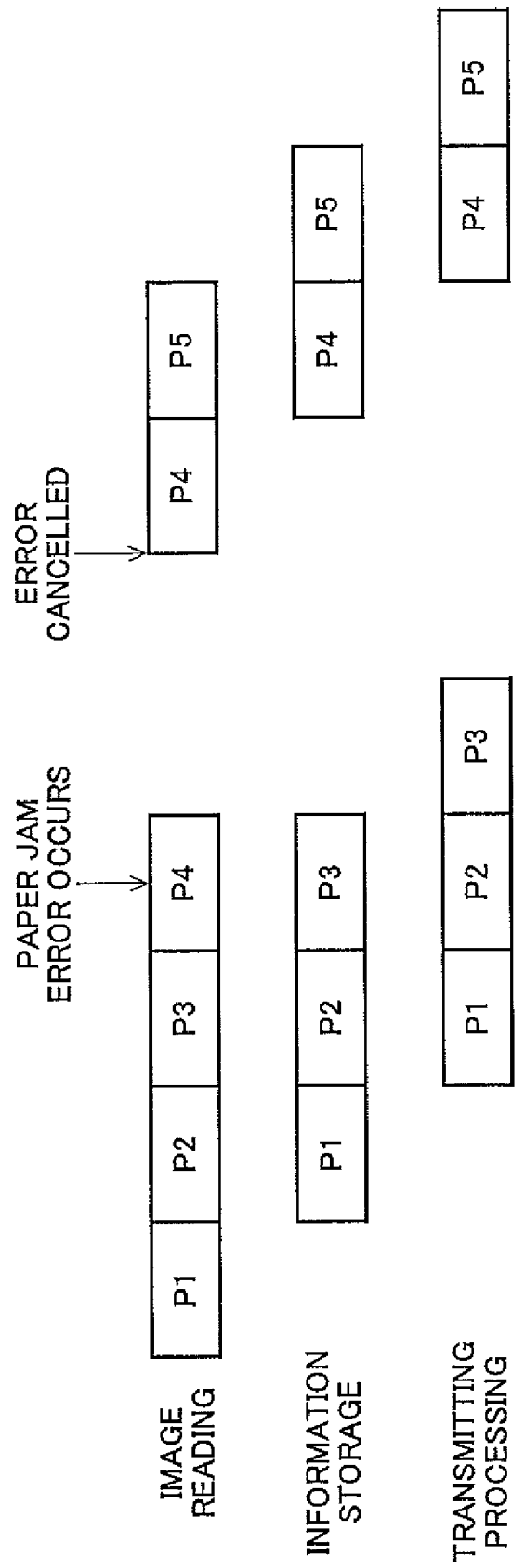
FIG. 12 is a diagram for explaining timings of processing for scanning/storing/transmitting after an error is cancelled using data flow for each page in processing of FIG. 11.

In this manner, in the image processing method described in reference to FIG. 11 to FIG. 13, when a paper jam error occurs in the middle of an input of image information, the control portion of the image processing apparatus 1 finishes normally the transmission of the image information that has been received until the occurrence of the paper jam error, and after cancelling the error, performs transmission of the image information input after the cancellation, and transmits an instruction to combine it with partial image information which has been transmitted before occurrence of the paper jam error along with the identifier to the information processing apparatus 2.

Then, when the input error does not occur, the control portion of the information processing apparatus 2 detects the completion of transmission relating to the transmission in the image transmission portion 14 through the communication portion 15, and thereafter combines the image information received by the communication portion 20 to form one file and stores it in the information storage portion 21. Moreover, the image processing apparatus 1 may start combining by determining on the side of the information processing apparatus 2 based merely on the identifier, instead of an instruction to combine.

According to the image processing method, when a paper jam error occurs, only the difference data is transmitted after recovery from the error and combining is performed on the side of the information processing apparatus 2 without deleting the file which has been transmitted, therefore, the restarting in the middle of the job is possible without losing the performance and the operability of the user is considerably improved.

In addition, as described above, the configuration may be made such that the user is able to select this image processing method or the image processing method according to the present invention described in reference to FIG. 1 to FIG. 10 using the operation portion 11 or the like.

According to the present invention, even when the input error of the image information such as the paper jam error occurs, transmission of the image information can be performed effectively.

The invention claimed is:

1. An image processing apparatus, comprising:
   an input portion for inputting image information;
   an information storage portion for storing the image information input by the input portion;
   a transmission portion for transmitting the image information; and
   a control portion for processing input at the input portion, storage at the information storage portion and transmission at the transmission portion in parallel, wherein
   the control portion, in case where an input error occurs in the middle of performing input of image information by the input portion, controls the transmission portion to transmit an instruction to delete information that has been transmitted to a transmission destination to the transmission destination, combines the image information before the input error occurs with the image information input at the input portion after the input error occurred to form one file, and controls the transmission portion to retransmit the file.

2. The image processing apparatus as defined in claim 1, wherein
   the control portion performs different post-error recovery processing for an input error and for other type of errors.

3. The image processing apparatus as defined in claim 2, wherein
   the control portion, when the other type of errors is a communication error, controls the transmission portion to start retransmission after checking a communication state with the transmission destination for a predetermined time.

4. The image processing apparatus as defined in claim 2, wherein
   the control portion, when the communication to the transmission destination is not established again, designates a second transmission destination and controls the transmission portion to perform transmission.

5. An image processing system provided with the image processing apparatus as defined in any one of claims 1 to 4 and an information processing apparatus connected to the image processing apparatus, wherein
   the information processing apparatus includes a reception portion that receives image information transmitted from the image processing apparatus; a storage portion that stores the image information received at the reception portion; and a control portion that combines the image information received at the reception portion to form one file and controls the storage portion to store the file after detecting transmission completion at the transmission portion, when the input error does not occur, and controls the storage portion to delete the image information which has been stored based on the instruction to delete and controls the storage portion to store the one filed image information which is received at the reception portion after the input error occurred.

* * * * *